May 22, 1962 R. A. SANFORD ETAL 3,035,383
THERMOCHROMATOGRAPHIC COLUMN
Filed Jan. 12, 1959 2 Sheets-Sheet 1

INVENTORS
R.A. SANFORD
G.E. PRICE
BY Hudson & Young
ATTORNEYS

May 22, 1962 R. A. SANFORD ETAL 3,035,383
THERMOCHROMATOGRAPHIC COLUMN
Filed Jan. 12, 1959 2 Sheets-Sheet 2

INVENTORS
R.A. SANFORD
G.E. PRICE
BY
Hudson & Young
ATTORNEYS

United States Patent Office 3,035,383
Patented May 22, 1962

3,035,383
THERMOCHROMATOGRAPHIC COLUMN
Richard A. Sanford and Glen E. Price, Bartlesville, Okla., assignors to Phillips Petroleum Company, a corporation of Delaware
Filed Jan. 12, 1959, Ser. No. 786,132
6 Claims. (Cl. 55—67)

This invention relates to improvements in thermochromatographic columns. Specifically it relates to a combination of apparatus for moving heat transfer means along a helical column, thereby to bring about a thermochromatographic separation of a mixture that has been introduced into the column.

Chromatography is a technique of analysis whereby the constituents of a mixture are first separated one from the other by some type of selective sorption means and then are analyzed. In order to improve, speed up, or to accomplish separations not otherwise feasible, it has been proposed to pass a temperature gradient along the column thereby to separate by thermal means the materials sorbed within the column. In laboratories, where this technique has been employed, it is common to use a straight column and employ means to move the temperature gradient therealong. While this is proper for laboratory instruments, it is not suitable for process control instruments that must be installed in chemical plants because of space requirements and the difficulty of adding the necessary associated instrumentation and anlayzing means.

Accordingly, this invention is directed to apparatus suitable for plant process control. Specifically, it relates to a helical chromatographic column operating in cooperation with means for moving a heat transfer means along the column, i.e., through a helical path. The instant invention provides a more compact unit that is easier than prior art devices to install and service in plants, that is easier to add necessary associated instruments thereto, and is not as likely to be damaged due to its excessive size or length by machinery and materials being moved in and around the plant or instrument board. By heat transfer means we refer to apparatus for heating or cooling a selected length of the column thereby to establish a desired temperature gradient.

It is an object of this invention to improve thermochromatographic columns. Another object is to provide a thermochromatographic column that is suitable for plant use in process control by reason of being more compact in design. Another object is to provide a helical column plus means to move a heat transfer means therealong. Other objects and advantages will become apparend from the following disclosure.

Figure 1:
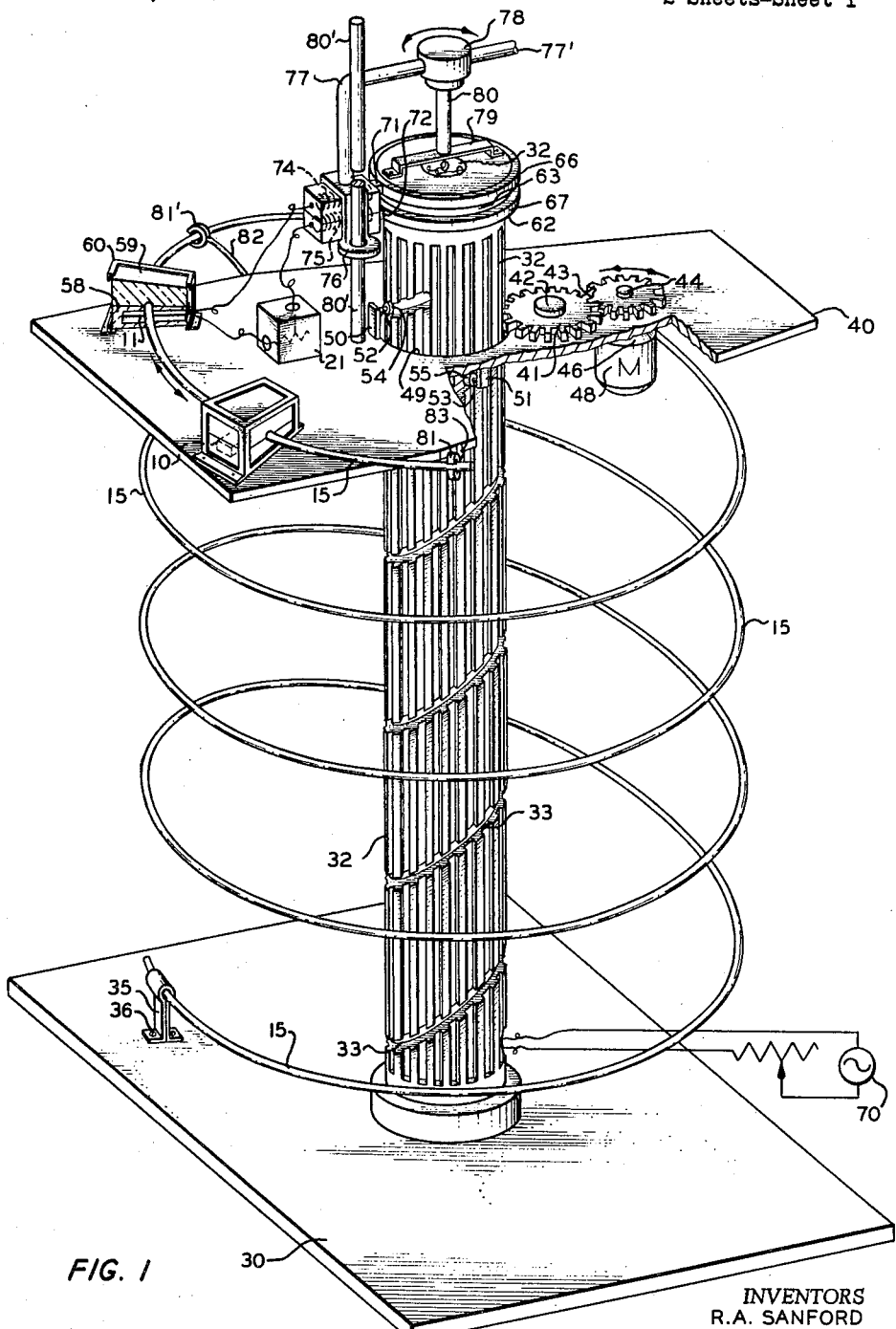
FIGURE 1 is an isometric view of one embodiment of the invention.

Referring now to FIGURE 1, a base 30 provides a support in which a splined shaft 32 is fixedly mounted. The shaft has a helical cam surface, groove 33 therein. In addition a support bracket 35 supports one end of the column 15 and is likewise secured by means such as a bolt 36 to the base. Similar means, not shown, are provided for the other end of the column. The column 15 is formed in helical form and the mechanism hereinafter described is for moving the heater along the helical column. A turntable 40 has an idler gear 41 which engages the splined shaft 32 and is secured to 40 by a shaft 42 and receives power from a pinion 43 which receives power from the shaft 44 out of the gear box 46. An electric motor 48 drives the pinion. The motor and gear box may be purchased commercially as a unit and secured by suitable means to the turntable 40. The kinematic chain 46 through 32 may be defined as a gear train. A hole 49 in the turntable 40 surrounds the shaft 32. Adjacent this hole and separated 180 degrees from each other are respective support members 50 and 51, supporting therefrom, respectively, axles 52 and 53 on which are mounted cam followers, i.e. rollers 54 and 55 which engage the helical groove 33 thereby to guide the turntable as it moves up the column when driven by the motor 48.

At the opposite end of the turntable and preferably mounted so as to counterbalance the gear motor 46, 48 is mounted a heat transfer means, e.g., heater 10. Preferably the heater is mounted in one of two graphite blocks 58 and 59 so that it may be in thermal contact therewith and so that the graphite blocks may simultaneously act as guide, a heat conductor, and a lubricating means while in sliding contact with the column 15 which moves through a shaped hole in each of the two respective blocks 58 and 59. The holes are shaped to correspond to and mate with the column exterior. The blocks of graphite or if desired, of copper or aluminum, are secured to each other, as by a spring held in tension between a pin protruding from each block and are loosely mounted in a frame 60 (secured to turntable 40 by screws or other removable means) so that they may move the requisite amounts necessary to maintain contact with the column without binding the mechanism and stopping the movement of the heater therealong.

At the top of the shaft 32 is a layer of electrical insulation 62 and a second layer of insulation 63 which separate the commutator elements 66 and 67 from each other. Either alternating or direct current is supplied from a source 70 to the latter which transmit electricity for heating, and if desired, for driving motor 48 through the brushes 71 and 72 and the control 21 to the heater. The brushes are preferably T-shaped pieces of graphite held by springs 74 and 75 in contact with their respective commutators. These assemblies are mounted in a shaped member 76 of insulating material which is mounted on a support arm 77 that is secured to bearing 78 for rotation about shaft 32. The bearing is supported by an insulating bracket 79 and vertical spacer 80 to be coaxial with shaft 32. Guide rod 80' restrains rotation of the assembly 71–76 with respect to the turntable, but permits and guides the rotation relative to the shaft 32. A similar construction, supported from arm 77', may be provided to power the motor 48. The individual heat control 21 is shown schematically and is also secured to the turntable. Bifurcated members 81' and 81 are supported from the turntable by means of arms 82 and 83 to provide support for the column and to aid in guiding it through the contact blocks 58 and 59.

Figure 2:
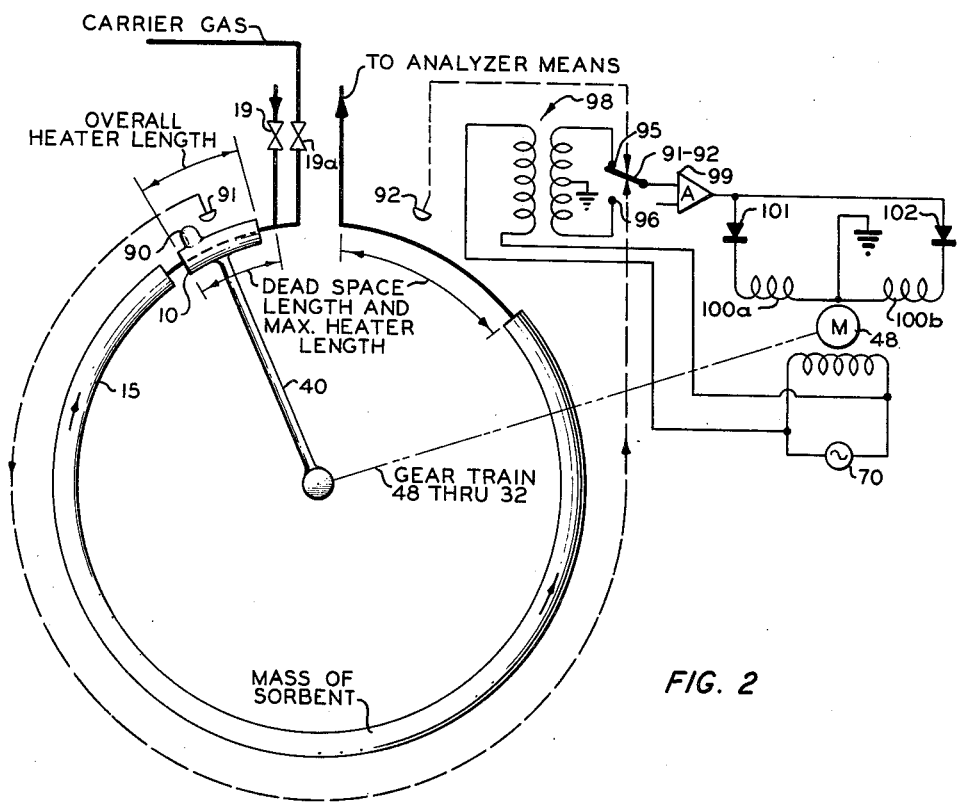
FIGURE 2 is a schematic drawing showing details not shown in FIGURE 1. Similar elements are denoted throughout by the same numbers.

Motor reversing means and the relationship of the dead space to the column 15 and the relationship of the heat transfer means to the dead space are shown in FIGURE 2. In the preferred embodiment, the dead spaces are disposed at the inlet and outlet of the column. These are preferably not filled with sorbent and provide space where the heat transfer means, such as heaters 10, can reside at the terminal points of its travel. This permits the establishment of a temperature gradient on the column proper and the gradual moving of it into the mass of sorbent. It also permits the moving of the temperature gradient out of the mass of sorbent at the outlet. In order to permit the establishment of temperature gradient where not desired, the dead space should be of a length at least equal to that of the heater 10.

Mounted on either the turntable or the heater itself is a cam 90 which engages the reversing switch 91 at the inlet of the column and a similar reversing switch 92 at the outlet of the column. These reversing switches operate appropriate mechanism to reverse the polarity of the motor in order that it can return to the other end of the column. In the embodiment shown the cam 90 causes the switch 91 to make a contact at 95 to pass power to the poles of motor 48. This motor can be a shaded pole motor if desired. Similarly when the heater reaches the outlet of the column, switch 92 makes a contact 96 which reverses the polarity of the motor thereby driving the heater back down to its starting position. As shown, power is supplied to the field of the motor from the source 70, and is also stepped down in transformer 98 where it is applied through the switch mechanism 91, 92 to an amplifier 99 thence to the poles 100a and 100b of the motor. The secondary of transformer 98 has a grounded center tap, as do the poles of the motor. In the circuit of each of the respective poles is a rectifier 101, and 102. It should be noted that the motor 70 receives power through a brush arrangement similar to that shown for the heaters in FIGURE 1.

At this point it should be noted that certain apparatus not considered as part of this invention is ordinarily associated with the chromatographic column 15. Such apparatus would include an analyzer means at the outlet of the column and in a plant would include a timing switch or the like to control the admission of samples and of carrier gas, to the inlet through valves such as valve 19. If desired, the timer could also control the reversing of the motor. The analyzer means previously mentioned could include such apparatus as infrared or ultraviolet analyzers, differential refractometers, but preferably includes a direct current bridge having a thermistor in one branch thereof which is disposed in the outlet stream from the column 15. The cooling effect on the thermistor of the respective gases eluted from the column unbalances the bridge, the output of which is applied to a recorder and generates the peaks which are traditionally associated with chromatographic analyses.

The column itself should be constructed of a heat conductive material such as copper but Everdur or stainless steel may also be suitable. The sorbent includes materials such as silica gel, activated charcoal, finely crushed fire brick, diatomaceous earth, or sodium-aluminum-silicates or similar crystaline zeolitic materials which are commonly called molecular sieves and are sold under the trade name of Linde Molecular Sieve. These sorbents may also support a liquid sorbent which is selected according to the separation to be made within the column. If desired, it may be necessary to connect this column 15 in series with a preceding or a succeeding column in order to effect a finer separation.

In operation of the instant apparatus, it is assumed that a sorbent has been selected that is suitable for use with the sample to be analyzed. Also, that a carrier gas which will not react with the sample such as helium, argon, or nitrogen is supplied at a constant rate to the inlet of the column. The velocity of gas flow and the velocity of heater movement through and along the column, respectively, are parameters which it is necessary to control in order to obtain reproducible results. These factors are all assumed to be held at preselected levels during operation.

A sample is admitted through valve 19, and carrier gas is admitted at a predetermined rate through valve 19a. The heater 10 is disposed at the inlet end of the column as shown schematically in FIGURE 2 and power is then applied to the motor 48 and to the heat transfer means such as heater 10 through respective brushes mounted at the top of the splined column 32. This causes the temperature gradient to be established across the first dead space, i.e., the one at the inlet, and also causes the turntable and other mechanism to begin moving and to accelerate to its desired linear velocity along the helical path to be traveled. The heat transfer means than proceeds to move into thermal contact with the mass of sorbent within the column and is moved along the helical path by the cooperation of the cam followers 54 and 55 with the cam surface formed by the groove 33.

The materials within the column are eluted in accordance with their characteristics under the temperatures established by the heat transfer means 10, and move along the column with 10 until the second dead space at the outlet is reached. At this time, the heater then ceases to operate on the sorption mechanism within the column and actuates the switch 92 to reverse the polarity of motor 48 which moves the heater back down the column. A refinement in design would also cause the heat transfer means 10 to be turned off during the return trip so that carrier gas can proceed to flush the column and assure that it is clean for the next separation. When the heat transfer means has returned to its starting position it actuates the switch 91 which again reverses the polarity of the motor 48 to cause the heater to reverse its direction and repeat the preceding described operation.

It should now be evident that we have invented an improved thermochromatographic column. The result of this invention is that a longer column can be compressed into a smaller space, and that the heating means can be moved along the helical path formed by the column when so compressed. This permits a compact design which renders the assembly suitable for use in plant process control while still providing a column of adequate length to accomplish difficult separations that requires extremely long columns. This offers an improvement over the prior art which does not provide any such apparatus for heating a helical column in the manner and with the apparatus we have described.

While we have shown our invention with respect to specific embodiments, we do not wish to be bound or limited only to those shown in the foregoing specification and accompanying drawings. We wish to include as our invention all those modifications thereof which should be obvious to one skilled in the art and also those equivalents of the apparatus we have shown which would be obvious to one skilled in the art.

I claim:

1. The combination comprising a column having an inlet, a first dead space, a mass of sorbent, a second dead space, and an outlet disposed in the order named along the column, said column being shaped to provide a helical path at least through said mass of sorbent; a means for heating a portion of said column and the contents thereof, disposed in thermal contact with a portion of the helical path of said column; means for moving said means for heating along said helical path while maintaining thermal contact between a portion of said column and said means for heating, and means for automatically reversing the direction of travel of said means for moving when said means for moving reaches a predetermined point along said helical path.

2. A method of effecting a thermochromatographic separation of a selected component from a sample of a mixture, comprising forming a mass of sorbent surrounded by a conduit having a helical path between its inlet and outlet, passing a sample of the mixture into the mass thus formed, flowing a carrier gas through the mass at a pre-selected velocity, establishing a temperature zone in thermal contact with a portion of said conduit for heating a portion of said conduit and its contents, establishing a first dead space adjacent said inlet, establishing a second dead space adjacent said outlet, retaining said temperature zone in said first dead space until the temperature of the temperature zone is raised to a preselected value, moving said temperature zone along said helical path while maintaining thermal contact between said temperature zone and a portion of said conduit, and automatically reversing the direction of travel of said temperature zone when said temperature zone has moved into said second dead space.

3. The combination comprising a chromatographic column having a helical path between its inlet and outlet, means disposed in thermal contact with a portion of said column for heating a portion of said column and its contents, and means for moving said means for heating in a helical path while maintaining said means for heating in thermal contact with a portion of said column; said means for moving comprising a base member, a splined shaft mounted on said base member, having its axis coincident with the axis of the helical path, and having a helical cam surface arranged peripherally thereon, the lead of said helical cam surface being equal to the pitch of the helical path of said column; a turntable; means for engaging said helical cam surface; means for supporting said means for engaging from said turntable; a motor; and a gear train connecting said motor to the splines on said shaft; said means for heating being mounted on said turntable; whereby operation of said motor rotates said turntable about said shaft and said means for engaging follows said cam surface, thus advancing said means for heating along the column.

4. The combination that comprises a column having a helical path that includes a first dead space, a mass of sorbent, and a second dead space disposed therealong; a means for heating a portion of said column and the contents thereof, disposed in thermal contact with said column and having a maximum overall length along the aforementioned helical path that is no more than equal to one of said dead space lengths therealong; and means for moving said means for heating along a helical path while maintaining said means for heating in thermal contact with a portion of said column; said means for moving comprising a base member; a splined shaft mounted on said base, having its axis coincident with the axis of the helical path, and having a helical cam surface arranged peripherally thereon, the lead of said helical cam surface being equal to the pitch of the helical path of said column; a turntable; means for engaging said helical cam surface; means for supporting said means for engaging from said turntable; a motor; and a gear train connecting said motor to the splines on said shaft; said means for heating being mounted on said turntable whereby operation of said motor rotates said turntable about said shaft and said means for engaging follows said cam surface, thus advancing said means for heating along the column.

5. The combination that comprises a column having a helical path that includes a first dead space, a mass of sorbent, and a second dead space disposed therealong; a means for heating a portion of said column and the contents thereof, disposed in thermal contact with said column and having a maximum overall length along the aforementioned helical path that is no more than equal to one of said dead space lengths therealong; means for moving said means for heating along a helical path while maintaining said means for heating in thermal contact with a portion of said column; and means for automatically reversing the direction of travel of said means for moving when said means for moving reaches a predetermined point in said last-mentioned helical path.

6. The combination comprising a chromatographic column having a portion thereof formed in a helix and means for moving a heat transfer means along said portion formed in a helix; said means for moving comprising a base member; a splined shaft fixedly mounted on said base, having its axis coincident with the axis of the helical path, and having a helical cam surface arranged peripherally thereon, the lead of said helical cam surface being equal to the pitch of the helical path of said column; a turntable; means for engaging said helical cam surface; means for supporting said means for engaging from said turntable; a motor; and a gear train connecting said motor to the splines on said shaft.

References Cited in the file of this patent

UNITED STATES PATENTS

| | | |
|---|---|---|
| 2,126,552 | Holloway | Aug. 9, 1938 |
| 2,398,818 | Turner | Apr. 23, 1946 |
| 2,456,775 | Fausek et al. | Dec. 21, 1948 |
| 2,839,152 | Tracht | June 17, 1958 |
| 2,841,005 | Coggeshal | July 1, 1958 |